Dec. 15, 1942.    L. V. SMITH    2,305,279
DISPLAY CASE AND METHOD OF PRODUCING SAME
Filed July 18, 1938    3 Sheets-Sheet 1
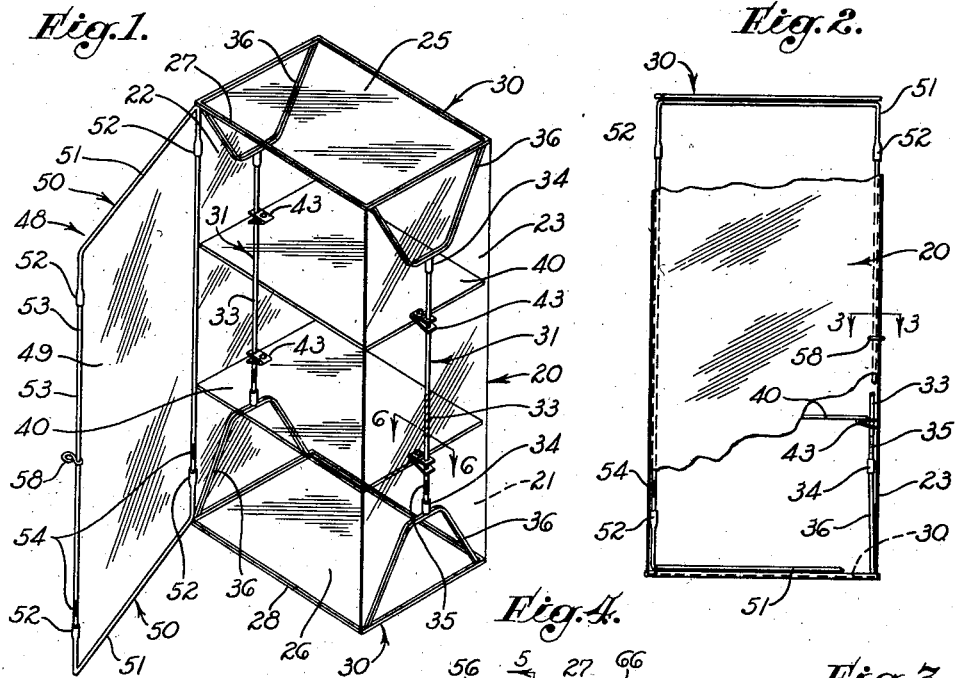
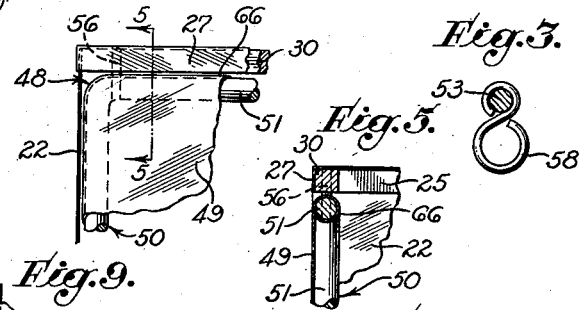
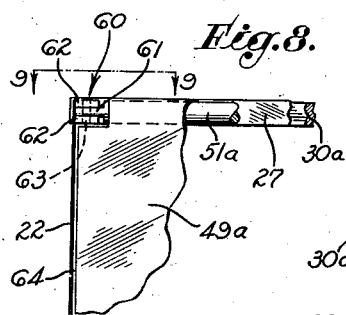
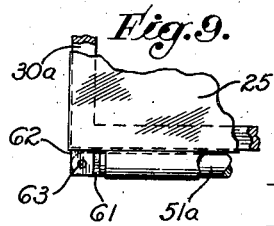
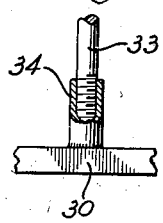
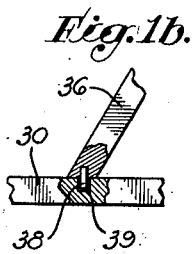
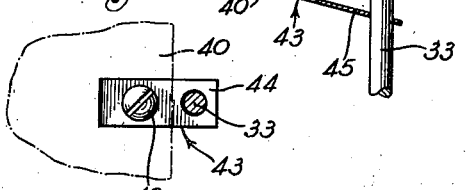
INVENTOR
LEWIS V. SMITH
BY HARRIS, KIECH, FOSTER & HARRIS
FOR THE FIRM
ATTORNEYS.

Dec. 15, 1942.  L. V. SMITH  2,305,279
DISPLAY CASE AND METHOD OF PRODUCING SAME
Filed July 18, 1938  3 Sheets-Sheet 2
Fig.10.
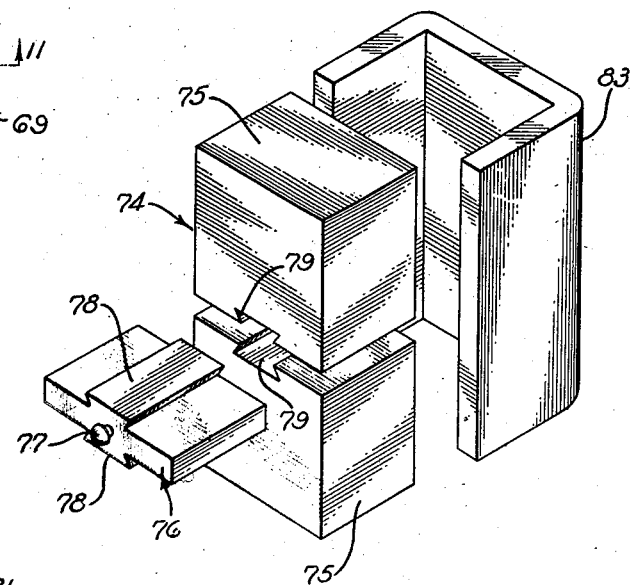
Fig.13.
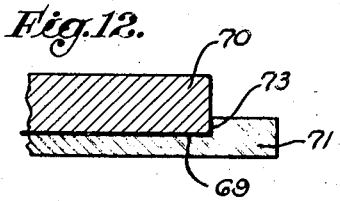
Fig.11.
Fig.12.
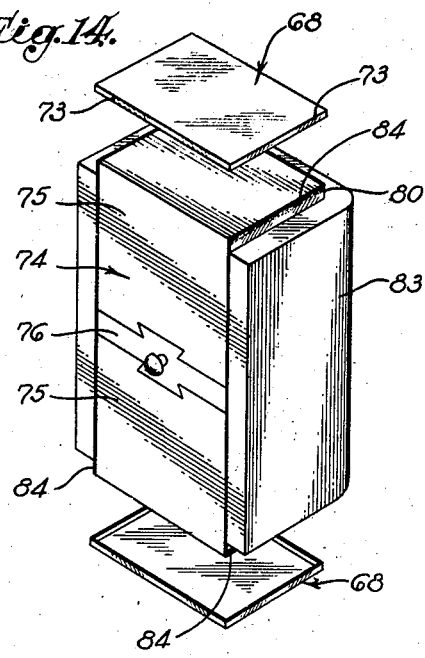
Fig.14.
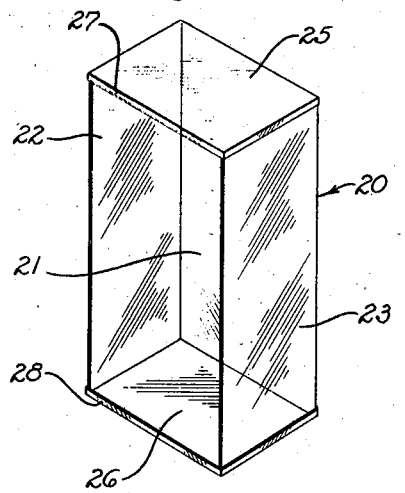
Fig.15.
INVENTOR
LEWIS V. SMITH
BY
HARRIS, KIECH, FOSTER & HARRIS
FOR THE FIRM
ATTORNEYS.

Dec. 15, 1942. L. V. SMITH 2,305,279
DISPLAY CASE AND METHOD OF PRODUCING SAME
Filed July 18, 1938 3 Sheets-Sheet 3
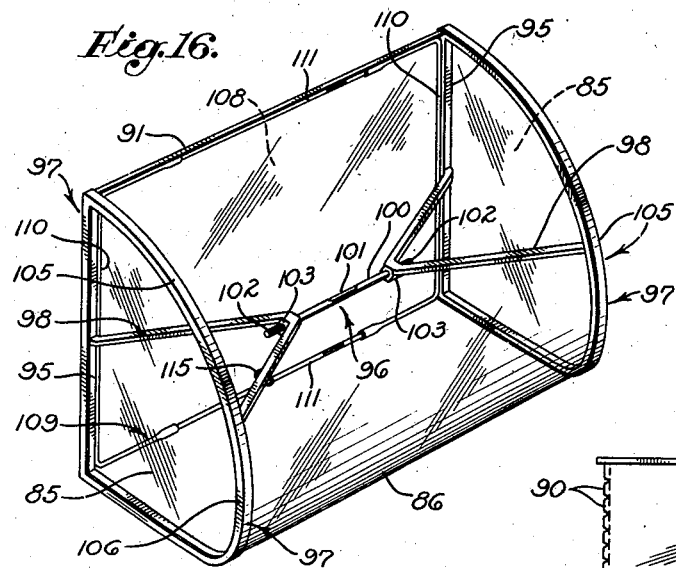
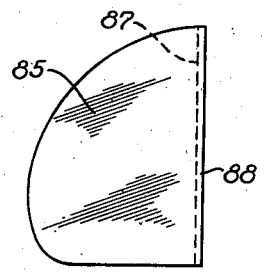
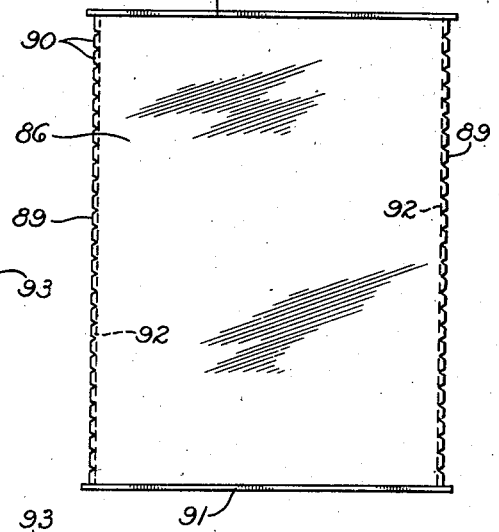
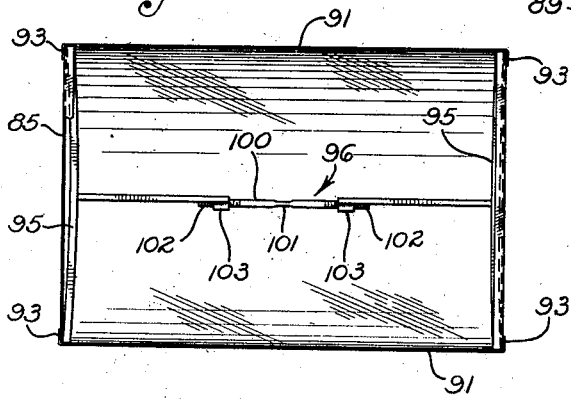
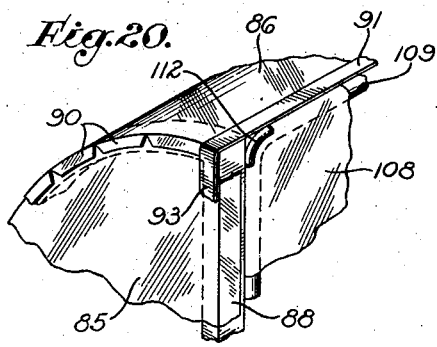
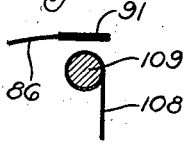
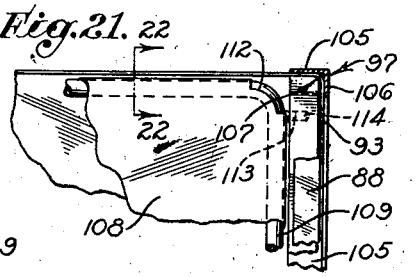
INVENTOR
LEWIS V. SMITH
BY HARRIS, KIECH, FOSTER & HARRIS
FOR THE FIRM
ATTORNEYS Patented Dec. 15, 1942

2,305,279

UNITED STATES PATENT OFFICE 2,305,279

DISPLAY CASE AND METHOD OF PRODUCING SAME

Lewis V. Smith, Los Angeles, Calif., assignor to Tenflex Products Corporation, Los Angeles, Calif., a corporation of California Application July 18, 1938, Serial No. 219,764

22 Claims. (Cl. 206—44)

My invention relates to containers having transparent walls, with special reference to display cases and the like, and is directed to an improved construction for such container incorporating flexible transparent sheets of plastic material, and is further directed to a method of manufacturing such container.

The general object of my invention is to provide a light non-fragile transparent container or case of inexpensive construction. One object of my invention is to provide in a display case construction a frame in combination with a replaceable flexible transparent envelope, the frame being adjustable for engagement with the envelope and being yieldably flexed, as will be described, to place the walls of the envelope under tension. A more specific object is to provide in such a combination, tension means acting on the frame in compensation for openings in the envelope.

A further object of my invention is to provide a panel of unique construction incorporating transparent, non-fragile material to serve as a closure for such a display case.

Other objects in mind relate to the method of fabricating the envelope for my container and the panel that serves as the closure therefor. Among the more general of these objects is to manufacture an envelope with standard dimensions to fit standard frames. One of the more specific of these objects is to utilize a mold for producing the display case envelope in an advantageous manner.

The above and other objects of my invention will be apparent from the detailed description to follow, considered with my accompanying drawings.

In the drawings:

Fig. 1 is a perspective view of a vertical display case constructed in accordance with the principles of my invention;

Fig. 1a is a fragmentary view on an enlarged scale partly broken away showing a modification of one portion of the display case frame;

Fig. 1b is a fragmentary section on an enlarged scale showing a joint construction that may be incorporated in the frame;

Fig. 2 is a rear view of the display case with the door closed, the door being partly broken away;

Fig. 3 is a section through the door frame taken as indicated by the line 3—3 of Fig. 2;

Fig. 4 is an enlarged fragmentary view of a corner of the display case of Fig. 1 showing a pivotal connection between the display case and its closure member;

Fig. 5 is a section taken as indicated by the line 5—5 of Fig. 4;

Fig. 6 is a section on an enlarged scale through the frame of the display case taken as indicated by the line 6—6 of Fig. 1;

Fig. 7 is a view taken as indicated by the line 7—7 of Fig. 6;

Fig. 8 is a view similar to Fig. 4 showing a modified form of closure mounting;

Fig. 9 is a view taken as indicated by the line 9—9 of Fig. 8;

Fig. 10 is a plan view of a pair of dies positioned to form an end sheet of an envelope as included in my invention;

Fig. 11 is a fragmentary section on a somewhat enlarged scale taken as indicated by the line 11—11 of Fig. 10;

Fig. 12 is a view similar to Fig. 11 with the dies moved together to form edge flanges in the end sheet;

Fig. 13 is a perspective view of a set of body molds that may be employed in fabricating the envelope;

Fig. 14 is a perspective view of the die showing the relation to the sheets of material in the course of fabricating the envelope;

Fig. 15 is a perspective view of the envelope after the dies are removed;

Fig. 16 is a perspective view of a horizontal display case constructed in accordance with my invention;

Fig. 17 is a plan view on a reduced scale of a head sheet of the horizontal display case;

Fig. 18 is a plan view of the body sheet for the horizontal display case at an intermediate manufacturing stage;

Fig. 19 is a rear elevation of the horizontal display case partly in section showing the disposition of the internal frame relative to the envelope prior to final expansion of the spreader means;

Fig. 20 is a fragmentary perspective view on an enlarged scale of a corner of the finished horizontal display case, an external frame member being removed to reveal the construction of the case;

Fig. 21 is a fragmentary rear view of a corner of the horizontal display case partly in section; and Fig. 22 is an enlarged section taken as indicated by the line 22—22 of Fig. 21.

My invention is characterized by the conception of employing with an envelope of transparent flexible material an expansile frame means within the envelope acting between the ends thereof to place the walls of the envelope under tension, thereby providing a suitably rigid self-supporting structure. The envelope may be of any one of a number of configurations provided the accompanying frame is complementary thereto and adapted to expand against opposing walls thereof.

One form of display case shown in Figs. 1 and 2 incorporates an envelope, generally designated 20, constructed as best shown in Fig. 15. Any number of well known flexible transparent materials now on the market under various tradenames may be employed. Since this particular envelope chosen for illustration is open over substantially the whole of its rear face, the envelope has only three longitudinal walls, namely, a front wall 21 and two side walls 22 and 23. The top end wall 25 and the bottom end wall 26 of the envelope preferably are provided with marginal flanges 27 and 28 respectively in the plane of the rear face of the envelope, which flanges may be regarded as comprising the rear wall of the envelope.

The expansile frame for the envelope may be constructed, for example, as indicated in Fig. 1, the essential parts of the frame being a pair of end frames, generally designated 30, corresponding to the configuration of the ends of the envelope, the end frames in this case being rectangular, and one or more spreader means, generally designated 31, adjustably interconnecting the end frames. The two end frames 30 extend along the edges of the end walls of the envelope so that force exerted between the end frames tending to force the end frames apart is transmitted into tension across the side and end walls of the envelope. I prefer to provide two of the spreader means 31 acting independently at opposite edges of the end frames 30 and to provide for a certain degree of flexibility in the frame assembly, the purpose of these two provisions being to achieve a frame assembly that will readily accommodate itself to variations in the longitudinal dimensions of the frame or to variations in elasticity of the material placed under tension by expansion of the frame. The flexibility of the frame may be provided by making the spreader means 31 inherently flexible or by providing a degree of articulation in the connections between the spreader means and the end frames, or may be provided by both of these expedients.

Each of these spreader means 31 includes a rod 33 having its opposite ends in screw-threaded engagement with non-rotatable sleeves 34, the threads of the sleeves being in opposite disposition with respect to each other whereby rotation of the rod in one direction forces the sleeves apart and vice versa. For facilitating rotation of the rod 33 by a wrench or other tool, the rod may be suitably flattened at one point, as indicated at 35. The sleeves 34 may be fixedly mounted on the end frames 30, as indicated in Fig. 1a, but I prefer to mount the sleeves 34 on yokes 36, the ends of the yokes being connected to the end frames. To provide for a degree of articulation in the frame as suggested above, and to adapt the frame for separation into relatively flat parts, I may interconnect the yokes with the end frames in the manner indicated by Fig. 1b, each end of a yoke being provided with a lug or pin 38 that seats in a complementary recess 39 in an member 30.

One advantage of employing the yokes is that the yokes may have a desirable degree of inherent resiliency longitudinally of the envelope, and a second advantage is that the yokes may be slightly biased, as indicated in Fig. 2, to space the rods 33 inwardly from the side walls 22 and 23 of the envelope. Such spacing between the rods 33 and the side walls is desirable to provide clearance for using a wrench on the rods 33 and is also desirable to provide room for means to mount shelves 40 on the rods. These shelves may be plates of glass apertured at their opposite ends to receive small bolts 42, by means of which they are secured to spring clips 43 or other suitable means for engaging the rods 33. The clips 43 are of a well-known type characterized by two legs 44 and 45, apertured to receive a rod 33. Normally the tendency of the two legs of the spring clip to spread apart causes the rods to be engaged in a nonslidable manner, but the shelves may be readily adjusted vertically on the rods by simply compressing the spring clips.

The manner in which the display case may be assembled is apparent from the foregoing description. The two end frames 30 are placed against the inner faces of the end walls 25 and 26 of the envelope. Two yokes along one side wall of the envelope are then engaged in the opposite end frames and inter-connected by screwing a rod 33 into the sleevs 34 of the yokes, the rod being provided with the required number of clips 43. After both of the spreader means 31 are assembled in place, the rods 33 are turned sufficiently to place the desired degree of tension in the side walls of the envelope. The glass shelves 40 are then attached by the bolts 42 to the spring clips 43 which are then adjusted for height.

It will be noted that the upper end frame 30 is held in place by the front wall 21, the side walls 22 and 23, and the upper flange 27 of the envelope, and that the lower frame member is likewise retained by the walls of the envelope and the lower flange 28. Preferably, the flanges 27 and 28 are approximately of the same depth as the end frames 30, as best shown in Fig. 4.

The internal frame of the display case is unstable apart from the envelope because of its articulated construction, but it cooperates with the envelope in the assembled display case to provide a suitably rigid assembly. In other words, the envelope has a function usually associated with a frame member in that it serves as means to complete the structural organization necessary for the rigidity of the display case. The envelope by virtue of such function permits the omission of usually indispensable frame members, and since the frame has only the minimum requirement of withstanding stress in compression, the display case may be made exceptionally light in weight. By employing a relatively light frame with no frame members whatsoever along the edges of the longitudinal walls and by employing glass plates for the shelves 40, I achieve maximum visibility for the contents of the display case.

A further feature of the construction described is that breakage costs are insignificant; the material of the envelope, being flexible and relatively tough, will withstand considerable abuse including relatively severe impacts without breaking. Should an envelope be damaged, it may be readily replaced at relatively low cost, the frame being closely adjustable to any variations in dimension or resiliency of material in the substituted envelope.

If the envelope has substantially its whole rear face open as described, it may be desirable to add a closure or door to cover this opening. Any suitable closure construction may be employed.

For example, I may employ a door panel, generally designated 48, comprising a sheet of flexible, transparent material 49 stretched over a rectangular door frame 50. In the preferred form of my invention this door frame is made longitudinally expansible. Thus, the door frame may comprise two U-shaped end members 51 provided with internally threaded terminal sleeves 52. The end members 51 are interconnected by a pair of rods 53 similar to the previously described rods 33, each of the rods having oppositely disposed threads at its opposite ends and being provided with a flattened portion 54 to receive a wrench.

The door panel 48 is dimensioned to fit inside the opening at the rear of the envelope between the two end frames 30, preferably with sufficient clearance to permit independent variation in the longitudinal length of the door panel and in the spacing between the end frames 30. The door panel may be pivotally mounted by simply employing pins 56 at its upper and lower ends, each pin extending through an end frame 30 and an end member 51 of the door panel. To provide a handle for the door, a simple wire clip 58 may be mounted on the outermost rod 53, as best shown in Fig. 3.

In another door construction best indicated by Figs. 8 and 9, the innermost rod 53 is omitted and the two end members 51a of the door terminate in hinges generally designated 60. Each hinge 60 comprises a tongue 61 extending from the member 51a and a pair of tongues 62 extending outwardly from the corresponding end frame 30a inside the envelope, the tongues being interconnected by a pintle 63. It will be noted that the door sheet 49a is cut away to clear the hinge 60 and has an unsupported edge 64 extending adjacent the side wall 22 of the envelope. This second door panel is co-extensive with the display case and the longitudinal tension in the sheet 49a towards its inner edge is derived from the corresponding spreader means 31 within the envelope.

One feature of my invention relates to the preferred manner in which I fabricate the door panels. I cut the sheet to the desired size and configuration, the corners being notched out, apply heat to the margins of the sheet and turn up the edges sufficiently to engage the door frame 50. If the door frame is made of round rod, as indicated in the drawings, I turn the sheet edges to form arcuate edge flanges 66 to fit over the members of the door frame. The door frame itself may be employed as the mold for turning these edge flanges. The edge flanges 66 of the sheet may be glued directly to the door frame, but I prefer simply to dispose the edge of the flange against the sheet and to employ solvent to weld the flange to the sheet, the flange extending completely around the material of the frame. The door sheet 49 will, of course, be notched to clear the handle clip 58, and it may also be notched to clear the enlargements provided by the sleeves 52 of the door frame. After the sheet is effectively engaged with the door frame, the frame is expanded by rotation of the rods 53 to place the sheet material under longitudinal tension.

The preferred method of manufacturing the envelope 20 may be understood by reference to Figs. 10 to 14. I prefer to employ sheets of sufficient thickness to provide substantial resistance to deformation, or at least of sufficient thickness, for example, to make a flanged head in the disposition of the upper head 68 in Fig. 14 self-supporting when placed on a horizontal supporting surface. To form such a head, I heat at least the marginal portions of a sheet 69 of the proper dimensions and configuration and place the sheet between a die 70 and a die 71, as shown in Figs. 10 and 11. These dies may be made of wood. The die 70 is forced into the recess 72 of the die 71 as shown in Fig. 12, which action draws the material to form upturned flanges 73 on all four sides of the head, one of these flanges being a flange 27 or a flange 28 of the completed envelope.

The body sheet is formed over a contractile mold, generally designated 74, comprising two blocks 75 and an intermediate plate 76, the plate having a suitable handle 77 and tongues 78 dimensioned to fit into complementary grooves 79 in the two blocks. If the body sheet 80 is relatively thin, it may be simply wrapped around the mold, as shown in Fig. 14, and held in place by an outer casing 83 that extends around three sides of the mold and clamps the sheet in place as shown in Fig. 14. I prefer, however, to employ material of substantial thickness, in which case it is desirable to apply heat to at least the portions of the sheet that pass over the edges of the mold. The material is heated to sufficient plasticity to form permanent bends when clamped over the mold.

It will be noted that the outer casing 83 is somewhat shorter than the mold so that marginal portions 84 are exposed at each end of the body sheet 80. The flanged heads 68 may then be slipped over the ends of the mold 74 to overlap the marginal portions 84 of the body sheet. The overlapping surfaces of the sheets may be bonded together in any suitable manner. I prefer, however, to apply lightly a suitable solvent to one or both of the overlapping surfaces to make the plastic material temporarily adhesive and then simply to press the overlapping portions of the sheets together to make a permanent weld. In practice, I merely brush the solvent along the margins 84 of the body sheet and then move the heads 68 into place, pressing the flanges 73 of the heads against the body sheet.

After a relatively short period, the mold may be withdrawn to leave the finished envelope shown in Fig. 15. Since the mold must be contracted to clear the flanges 27 and 28 of the envelope, I initially withdraw the intermediate plate 76 of the mold to permit the blocks 75 to move away from the ends of the envelope.

To embody the principles of my invention in a horizontal display case, I prefer to employ the construction indicated by Figs. 16 to 22.

The envelope of the display case may be fabricated from a pair of end sheets 85 of the configuration shown in Fig. 17 and a body sheet 86 as shown in Fig. 18. Each of the end sheets 85 is folded, after the material is slightly heated, along the dotted line 87 to provide a marginal flange 88 (Fig. 20) along one edge corresponding to the flanges 27 of the end sheets in the first form of my invention and having the same purpose of engaging the corresponding end frame in the later assembly of the show case. The body sheet 86 is cut to the required dimensions and is notched along two opposite edges 89, the notches forming tongues 90. To each of the other two edges of the body sheet I may clinch a folded metal strip 91, the ends of each strip preferably extending beyond the edges 89 of the body sheet as shown in Fig. 18. The marginal portions of the body sheet 86 along the edges 89 are heated and then folded along the dotted lines 92 to bend the tongues 90 into disposition for engagement with the end sheets 85, the folding operation bending the end portions 93 of the strips 91. In fabricating the envelope, the tongues 90 of the body sheet and the end portions 93 of the metal strips are placed in overlapping relation to the end sheets 85, suitable forms being employed. The tongues 90 may be secured to the end sheets by glue or by employing solvent to weld the material together as previously described. I prefer not to attach either the end portions 93 of the strips 91 or the associated tongues 90 to the end sheets so that relative movement may be permitted between the ends of the strips and the adjacent local portions of the end sheets when the frame is expanded inside the envelope in the final steps of assembly.

The internal frame for supporting and tensioning the envelope comprises two internal end frames 95, interconnecting spreader means, generally designated 96, and two external frame members 97 adapted for frictional engagement with the envelope in cooperation with the internal end frames. The spreader means 96, in the preferred form of my invention, includes two yokes 98 integral with the internal end frames 95. A rod 100 having a flattened portion 101 to receive a wrench has oppositely threaded ends 102 extending into corresponding threaded ends 102 extending into corresponding threaded sleeves 103 that are formed in the yokes 98, so that rotation of the rod will produce relative movement between the yokes and, thereby, between the internal end frames 95.

I have found that a frame assembly of the construction described may tend to place greater stress in the body sheet 86 in the plane of the two yokes 98 than in other planes toward the top or bottom of the show case. I have discovered, however, that a satisfactory degree of stress equalization over the body sheet may be attained if the internal end frames 95 are slightly deformed prior to assembly of the display case so that the assembly operation causes the internal end frames to be flexed or sprung, the return flexure being accomplished against the tension of the body sheet. Fig. 19 shows the internal end frames 95 initially bowed inwardly in the manner I have in mind.

In the assembly process, the internal frame structure is placed inside the envelope as indicated in Fig. 19, the rod 101 being rotated suficiently to cause the internal end frames 95 to lie snug against the end sheets 85 of the envelope, but not being rotated sufficiently to place the body sheet 86 under any considerable tension. At this point in the assembly, the two external frame members 97 are slipped over the ends of the envelope.

It will be noted that each of the external frame members 97 is of angular cross-sectional configuration providing a flange 105 that embraces the side walls of the envelope, pressing the body sheet and the flange 88 of the end sheet against the corresponding internal end frame 95. The other flange 106 of each external frame member 97 overlies the marginal portions of the corresponding end sheet 85 concealing the tongues 90 and the end portions 93 of the metal strips 91, the tongues 90 and end portions 93 being pressed toward the corresponding internal end frame 95. It will be apparent that the external frame members 97 not only conceal the junctures in the envelope giving the show case a finished appearance, but also cooperate with the internal end frames 95 to strengthen such junctures against the possibility of the body sheet 86 being pulled away from the head sheets 85.

After the external frame members 97 are properly positioned to cooperate with the internal end frames 95, as described, the rod 100 is rotated to expand the internal frame structure longitudinally, flexing the bowed internal end frames to a desired finished configuration and thereby producing the desired tension and distribution of tension in the body sheet of the envelope. The final expansion of the internal frame structure accomplished by rotating the rod 100 to straighten the internal end frames 95 places considerable tension on the metal strips 91. A feature of the construction described, however, is that the metal strips yield to the expansion of the internal frame sufficiently to permit the desired amount of stress to be placed on the body sheet 86. On the other hand, the strips 91 are tension members of sufficient strength to compensate for the door opening in the envelope. Without such reinforcement the absence of tension across the back of the show case would permit the end frames to diverge out of the desired alignment, especially in a construction incorporating only a single central spreader acting between the two ends of the envelope. Initially, the end portions 93 of the metal strips 91 are bent at sharp angles, as indicated in Fig. 20. When the internal frame structure is expanded, however, these bends may yield to a desirable extent. I find it advisable to round the edges of the internal end frames 95, as indicated at 107 in Fig. 21, to whatever degree is necessary to favor this yielding action on the part of the flanged end portions 93 of the metal strip.

The opening at the rear of the show case may be closed by any suitable means, for example, by a sheet 108 of the flexible transparent material stretched on a rectangular frame 109. This frame is made longitudinally expansible, as previously described, by employing two U-shaped end members 110 interconnected by a pair of threaded rods 111. The door sheet 108 is cut away at the corners as indicated at 112 and the edges of the sheet are rolled over the door frame and secured thereto in the manner previously described. The door may be hung by a pair of pins 113 (Fig. 21) extending from each end of the door frame, the pins being disposed to enter complementary bores 114 in the internal end frames 95. When the door frame is expanded by rotation of the threaded rods 111 to place the door sheet 108 under tension, the frame is held in a position to register the pins 113 with the bores 114 so that the expansion of the door frame causes the pins to enter the corresponding bores. For convenience in opening and closing the door, a suitable handle 115 may be provided.

For the purposes of this disclosure and to illustrate the principles involved, I have described preferred forms of my invention in specific detail. The forms described will suggest to those skilled in the art various changes and modifications that do not depart from the essence of my invention; I specifically reserve the right to all such changes and modifications that properly come within the scope of my appended claims.

I claim as my invention:

1. A display case or the like, comprising: an envelope of flexible transparent material having opposite end walls and side walls continuous therewith; a complementary expansile frame within the envelope pushing outwardly against opposite walls thereof to place the envelope under sufficient tension to lend rigidity to the envelope and to give the material of the envelope the smooth appearance of glass, said frame including a pair of substantially rigid end members engaging said opposite walls and means for expanding said expansile frame and adapted to maintain said frame in any one of a plurality of stages of expansion, said frame tending to flex to a deformed configuration and in which at least some of the tension in said envelope is caused by opposition to such flexure.

2. A display case or the like, comprising: an envelope of flexible transparent material having opposite end walls and side walls continuous therewith; two frame means, one at each end of the envelope lying adjacent inner edges of the corresponding end wall of the envelope; and means extending in compression between said two frame means pressing said frame means against said end walls to complete the structural organization of the assemblage by placing said side walls of the envelope under tension.

3. A display case or the like, comprising: an envelope of flexible transparent material having opposite end walls integral with side walls, there being an opening extending over at least a part of one of said side walls, said opening being spaced from both of said end walls so that each end wall is continuous on each of its edges with an adjacent side wall; and an expansile frame within the envelope lying against said end walls and acting in compression between said end walls to complete the structural organization of the assemblage by placing said side walls under tension, said frame including a pair of substantially rigid end members engaging said end walls, said frame including means for expanding the same and adapted to maintain said end members in any one of a plurality of positions relative to each other.

4. A display case or the like, comprising: an envelope of transparent material having opposite end walls and side walls continuous therewith, one of said side walls being open to provide access to the interior of the envelope; a frame within the envelope corresponding to the configuration of said end walls of the envelope, said frame being expansile against said end walls of the envelope to place said side walls under tension; a closure frame pivoted to said frame in a position to cover said open side of the envelope; and a flexible sheet having its edges attached to said closure frame, said closure frame being expansile to place said sheet under tension.

5. A display case or the like, comprising: an envelope of flexible transparent material having opposite end walls and side walls continuous therewith; two frame means, one at each end of the envelope lying adjacent inner edges of the corresponding end wall of the envelope; spreader means extending in compression between said two frame means pressing said frame means against said end walls to complete the structural organization of the assemblage by placing said side walls of the envelope under tension; and a shelf supported by said spreader means.

6. A display case or the like, comprising: an envelope of flexible transparent material having opposite end walls and side walls continuous therewith; two frame means, one at each end of the envelope lying adjacent inner edges of the corresponding end wall of the envelope; and spreader means extending in compression between said two frame means pressing said frame means against said end walls to complete the structural organization of the assemblage by placing said side walls of the envelope under tension, at least one of said frame means having an unstressed configuration at variance with the configuration of the corresponding end wall and being strained towards the configuration of said end wall in opposition to compression in said spreader means and in opposition to tension in said side walls of the envelope.

7. A display case or the like, comprising: a body sheet of flexible transparent material; two end sheets of similar material marginally joined thereto forming therewith an envelope having opposite end walls and side walls continuous therewith; a complementary expansile frame within the envelope pushing outwardly against opposite walls thereof to place the envelope under sufficient tension to lend rigidity to the envelope and to give the material of the envelope the smooth appearance of glass, said frame including a pair of substantially rigid frame members engaging said opposite walls; and means of L-shaped cross-sectional configuration embracing each end of the envelope for concealing the junctures between said body sheet and said end sheets.

8. A display case or the like having in combination: walls of flexible transparent material, there being an opening in said walls to provide access to the interior of the case; a frame extending to opposite ends of said walls holding said material in tension to give said walls the appearance of smooth glass; and reinforcing means in tension across said frame to compensate for said opening in the distribution of stress to said frame.

9. A display case or the like, comprising: an envelope of flexible transparent material having opposite end walls and side walls continuous therewith, said envelope having an opening for access to the interior thereof; a strip of material encasing at least one of the edges of said envelope at said opening; and an expansile frame within the envelope pushing outwardly against opposite walls thereof to place the envelope under sufficient tension to lend rigidity to the envelope and to give the material of the envelope the smooth appearance of glass.

10. A display case or the like, comprising: two end sheets of flexible transparent material; a body sheet of similar material; finishing strips encasing the two longitudinal edges of said body sheet, said body sheet and finishing strips being flanged to provide end portions overlying said end sheets and joined therewith to form an envelope having opposite end walls and side walls continuous therewith; a complementary expansile frame within the envelope pushing outwardly against opposite walls thereof to place the envelope under sufficient tension to lend rigidity to the envelope and to give the material of the envelope the smooth appearance of glass; and means of L-shaped cross-sectional configuration embracing each end of the envelope for concealing the junctures between said body sheet and said end sheets.

11. A display case or the like, comprising: an envelope of flexible transparent material having opposite end walls and side walls continuous therewith; a frame within the envelope yieldingly extending in compression between said end walls to complete the structural organization of the assemblage by placing said side walls of the envelope under tension; and shelf means within the envelope supported by said frame.

12. A display case or the like including: an envelope of flexible transparent material having opposite end walls and side walls continuous therewith; a pair of frame members engaging opposite walls of said envelope; and tension means for moving said frame members apart to place said envelope under sufficient tension to lend rigidity to the envelope and to give the material of the envelope the smooth appearance of glass.

13. A display case or the like including: an envelope of flexible transparent material having opposite end walls and side walls continuous therewith; a pair of substantially parallel frame members engaging opposite walls of said envelope; and tension means for moving said frame members apart in parallel planes to place said envelope under sufficient tension to lend rigidity to the envelope and to give the material of the envelope the smooth appearance of glass, said tension means including means for moving said frame members apart to any one of a plurality of positions relative to each other and maintaining said frame members in such position.

14. A display case or the like including: an envelope of flexible transparent material having opposite end walls and side walls continuous therewith; a pair of frame members engaging opposite walls of said envelope, said frame members being slightly concave on their outer surfaces engaging said envelope; and tension means for moving said frame members apart to place said envelope under sufficient tension to lend rigidity to the envelope and to give the material of the envelope the smooth appearance of glass, the concavity of said frame members operating to distribute the tension exerted on said envelope.

15. In a door member for a display case, or the like, the combination of: a rectangular frame having two pairs of opposed side members; a sheet of flexible transparent material secured to one pair of said side members of said frame in substantially the same plane as said frame; and means for expanding the other pair of said side members to move said first pair of side members apart to place said sheet under sufficient tension to give the material of said sheet the smooth appearance of glass.

16. In a door member for a display case, or the like, the combination of: a rectangular frame having two pairs of opposed side members; a sheet of flexible transparent material secured to both pairs of said side members of said frame in substantially the same plane as said frame; and means for expanding one pair of said side members to move the other pair of side members apart to place said sheet under sufficient tension to give the material of said sheet the smooth appearance of glass.

17. In a door member for a display case, or the like, the combination of: a rectangular frame having two pairs of opposed side members; a sheet of flexible transparent material secured to all of said side members; and means for spreading one pair of said opposed side members apart to place said sheet under sufficient tension to give the material of said sheet the smooth appearance of glass.

18. In a door member for a display case, or the like, the combination of: a first U-shaped frame member; a second U-shaped frame member; a sheet of flexible transparent material secured to said frame members; a pair of connecting members connecting said frame members to form a frame, said connecting members each being threadedly connected to said frame members; and means for rotating said connecting members to force said frame members apart to place said sheet under tension sufficient to give the material of said sheet the smooth appearance of glass.

19. In a vertical display case or the like, the combination of: a top frame member; a bottom frame member; connecting means holding said frame members in spaced relation; a sheet of flexible transparent material secured relative to both of said frame members and forming a surface connecting said frame members; means for expanding said connecting means to place said sheet under sufficient tension to give the material of said sheet the smooth appearance of glass; and horizontal shelf means supported on said connecting means between said frame members.

20. A display case or the like including: an envelope of flexible transparent material having opposite end walls and side walls continuous therewith; a pair of frame members engaging opposite walls of said envelope; and tension means for moving said frame members apart to place said envelope under sufficient tension to lend rigidity to the envelope and to give the material of the envelope the smooth appearance of glass, said tension means being maintained out of direct contact with said envelope.

21. A display case or the like including: an envelope of flexible transparent material having opposite end walls and side walls continuous therewith; a pair of frame members engaging opposite walls of said envelope; and tension means for moving said frame members apart to place said envelope under sufficient tension to lend rigidity to the envelope and to give the material of the envelope the smooth appearance of glass, said tension means having an articulated connection with said frame members so that tension in said envelope gives the unified construction rigidity.

22. In a display case or the like, the combination of: a first frame member; a second frame member; connecting means between said frame members; a body sheet of flexible transparent material secured relative to both of said frame members and forming a surface therebetween having an opening therein; door means adapted to close said opening, including a first end frame secured relative to said first frame member, a second end frame secured relative to said second frame member, a connector member between said end frames, and a door sheet of flexible material secured to said end frames, said connector member being expansile to apply tension to said door sheet; and adjusting means for expanding said connecting means to place said body sheet under sufficient tension to give the material of said sheet the smooth appearance of glass, actuation of said adjusting means also applying tension to said door sheet.

LEWIS V. SMITH.